B. B. LEWIS.
Calendar Clock.
No. 34,341.
Patented Feb. 4, 1862.
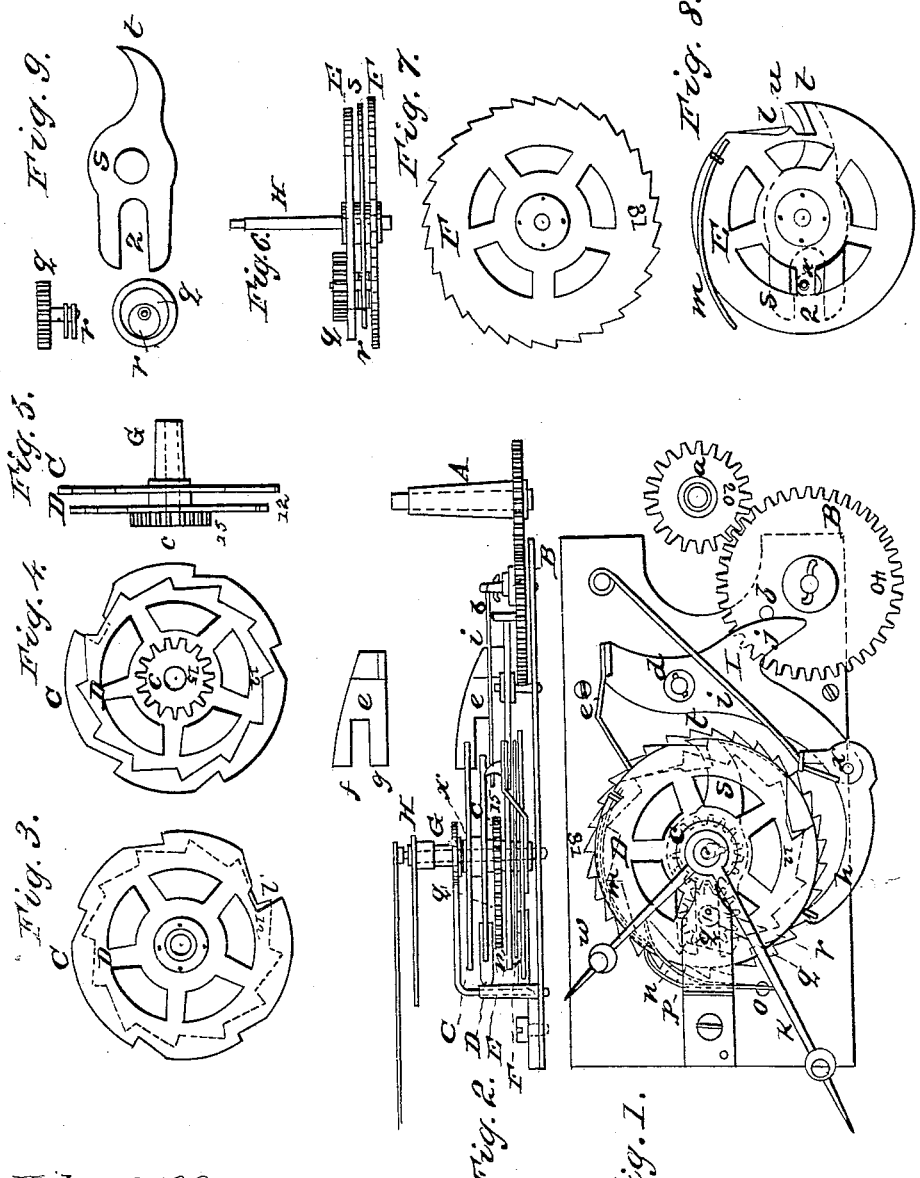
Witnesses
Edward W. Bliss
Jeremy H. Bliss
Inventor
B. B. Lewis

UNITED STATES PATENT OFFICE.

BENJAMIN B. LEWIS, OF BRISTOL, CONNECTICUT.

IMPROVEMENT IN CALENDAR-CLOCKS.

Specification forming part of Letters Patent No. 34,341, dated February 4, 1862.

*To all whom it may concern:*

Be it known that I, BENJAMIN B. LEWIS, of Bristol, county of Hartford, and State of Connecticut, have invented a certain new and useful Improved Calendar Attachment for Clocks; and I do hereby declare that the same is described and represented in the following specification and drawing; and to enable others skilled in the art to make and use said improvement I will proceed to describe its construction and operation, referring to the drawing, in which the same letters indicate like parts in each of the figures.

The nature of this improved calendar attachment for clocks consists, first, in so constructing it that it may be easily attached to a clock or clocks now in use, and, second, the nature in regard to their construction and operation will be more fully understood from the drawing and description.

In the accompanying drawing, A is a socket-spindle having a gear $a$ of about twenty teeth and is the spindle on which the hour-hand is to be secured to indicate the hour of the day, and revolves (when in full running order) once in twelve hours.

B is a gear of forty teeth, (or twice the number of the teeth in the gear $a$,) which mesh into the teeth of the gear $a$, so that one revolution thereof will be produced by every two revolutions of the gear $a$. Said gear B is also provided with an actuating-pin $b$ and actuates a moving lever I once in twenty-four hours or at every revolution thereof.

C D E F are four principal wheels arranged and turning on the same center of motion.

G is a socket-spindle having a gear $c$ secured on the lower end thereof, having fifteen teeth.

D is a twelve-tooth or year wheel, one tooth for each month in the year, and is secured firmly on the spindle G and close to the gear $c$.

C is a compensating wheel, also secured firmly to the socket-spindle G just above the wheel D to compensate for the shorter months of the year, and also for February in leap-year.

F is a count or month wheel having thirty-one teeth, which are moved one tooth each day of the month when there are thirty-one days in a month.

E is a compensating wheel, which, with the wheel F, is arranged and secured firmly on the spindle H.

I is what I call a "yielding click-lever," which is secured and oscillates on the pin $d$, on one end of which is made or secured a forked or other proper shaped guard or count hook $e$. The upper and lower portions $f$ and $g$ bear against the outer edge or periphery of the wheels C E. Upon the other end of the lever I is made a pawl $h$, or what may be called a "jointed" or "pivoted" portion of the lever I, secured at $z$, the outer end of which is made to fit into the teeth of the wheel F. Said lever is kept in its proper position for use by the action of a spring $i$ or its equivalent.

$j$ is an arm of the lever I, by which it (the lever) receives its actuating power from the pin $b$ of the wheel B and moves the wheel F forward one notch every revolution of the wheel B, and designating the day of the month by its pointer $k$.

To be more particular in regard to the four wheels C D E F, as already stated, the wheel F is provided with thirty-one teeth, equal to the number of the days in any of the seven months of the year, (January, March, May, July, August, October, and December.) The wheel E has one notch $l$ cut in its edge nearly like one of the notches $l'$ cut in the edge of the wheel C, (see Figs. 8 and 3,) the object of which is to act conjointly with the notches in the wheel C to allow the guard $e$ to drop into both of said notches at the close of the 28th day of February, thereby causing the pawl $h$ to draw back over three of the teeth in the wheel F, thereby throwing the pointer $k$ forward on the dial from the 28th day of February to the 1st day of March. On the same wheel E, I arrange near the outer edge a spring-catch $m$, the object of which is that while the wheel E is revolving said catch is thrown into one of the notches of the wheel D by coming in contact with the spring $n$, secured in a stud $o$, thus moving the wheel D along until it passes the end of the spring $n$, thereby liberating the catch $m$, while the spring $n$ drops into the notch just vacated by the catch $m$, thus preventing any backward motion of the wheel D. The spring $p$ acts as a pawl in the teeth of the wheel F. Again, in or on the same wheel E, I arrange a small gear $q$, having twelve teeth, or three teeth less than the one *c* on the socket-spindle G on the same spindle, and on the opposite side of the wheel E is secured a cam *r* on the spindle H, and between the wheels E and F is a guard-plate *s*, the end of which at *t* is made hook-shaped and projects outward from its fulcrum even with the edge of the wheel E. The other end at Q is slitted to receive the cam *r*. Now it will be noticed that by making the gear *q* with three less number of teeth than the gear *c*, by turning the wheel D every fourth revolution thereof more than the wheel E will cause the hook end *t* of the guard-plate *s* to move forward of the heel of the notch *l* in the wheel E. (See Fig. 8.) Thus every fourth year, and in the month of February, the guard *e* will drop into the notch *l* one day later and strike upon the step *u*, thus preventing the pawl *h* from falling back but two teeth in the wheel F, thereby allowing twenty-nine days in the month of February every fourth year. The wheel D has twelve teeth—one for each month in the year—and the wheel C has five notches, four of which are of such depth as to allow the guard *e* to drop sufficiently to allow the pawl *h* to move over two teeth of the wheel F for the months of April, June, September, and November. The pointer *w* upon the upper end of the socket-spindle G indicates on the dial (when in place) the month of the year, and the pointer *k* the day of the month. I believe I have thus shown that four wheels arranged upon a common center with their proper integral parts will in regular succession cause the pointers attached thereto to indicate accurately the month and the day of each of the months, including February in leap-year.

C D and E F may be considered each as one wheel, and may be called the "month" and "year" wheels, and they constitute the prominent and distinguishing feature of this improvement; and I have also shown the nature, construction, and the operation of the said improvement, so as enable a person skilled to make and put the same into use. It is much cheaper of construction, and more accurate and durable in operation, which gives to it a decided advantage over others now in use.

I do not claim the wheel or plate revolving around or upon the same center back of the time-dial, bearing on its face the name of the month and showing the same through openings in the time-dial; but

What I claim, and desire to secure by Letters Patent, is—

1. Arranging the month-wheel F and the year-wheel D to turn upon the same center, in combination with the indicating-pointers that point to the numerical day of the month and the month of the year depicted on the face of the time-dial as a distinct attachment or device for a clock, substantially as and for the purpose described.

2. The gears *q c*, cam *r*, and plate *s*, combined with the wheels E F, arranged and operating substantially in the manner and for the purpose described.

3. The hinged and pivoted click-lever I, in combination with the guard *e* and gear B, arranged to communicate motion once in every twenty-four hours from the center or time spindle A or gear *a* to the wheel F and at the same time to adjust itself to show on the face of a dial through an indicating-pointer *k* the day or number of days in each of the months, substantially as described.

B. B. LEWIS.

Witnesses:
EDWARD W. BLISS,
JEREMY W. BLISS.